United States Patent [19]
Fettinger

[11] 4,106,089
[45] Aug. 8, 1978

[54] ALTERNATING CURRENT POWER DIVIDING OR COMBINING SYSTEM

[75] Inventor: Paul I. Fettinger, Garden Grove, Calif.

[73] Assignee: The Garrett Corporation, Los Angeles, Calif.

[21] Appl. No.: 722,184

[22] Filed: Sep. 10, 1976

[51] Int. Cl.² .............................................. H02M 5/14
[52] U.S. Cl. ..................................... 363/153; 336/12
[58] Field of Search ................ 321/5, 9 R, 26, 27 MS, 321/57, 68, DIG. 1; 336/5, 12; 363/39, 40, 44–47, 153–155

[56] References Cited
U.S. PATENT DOCUMENTS

| | | | |
|---|---|---|---|
| 3,657,633 | 4/1972 | Urish | 321/27 MS |
| 3,671,901 | 6/1972 | Lys | 321/57 |
| 3,792,286 | 2/1974 | Meier | 321/27 MS |
| 3,838,331 | 9/1974 | Jensen | 321/27 MS |
| 3,876,923 | 4/1975 | Humphrey et al. | 321/5 |

*Primary Examiner*—William M. Shoop
*Attorney, Agent, or Firm*—Joel D. Talcott; Frank J. Kowalski; Albert J. Miller

[57] ABSTRACT

Current transformers are utilized to combine the outputs of two 30° phase shifted inverters to produce a three phase output which is low in fifth and seventh harmonics. The arrangement utilizes transformers having volt-ampere ratings which are very low compared to the power output of the inverters. The circuit may also be used to convert a three phase input to a multiphase full wave rectified output without reflecting high fifth and seventh harmonics back into the line.

5 Claims, 8 Drawing Figures

Fig. 6.
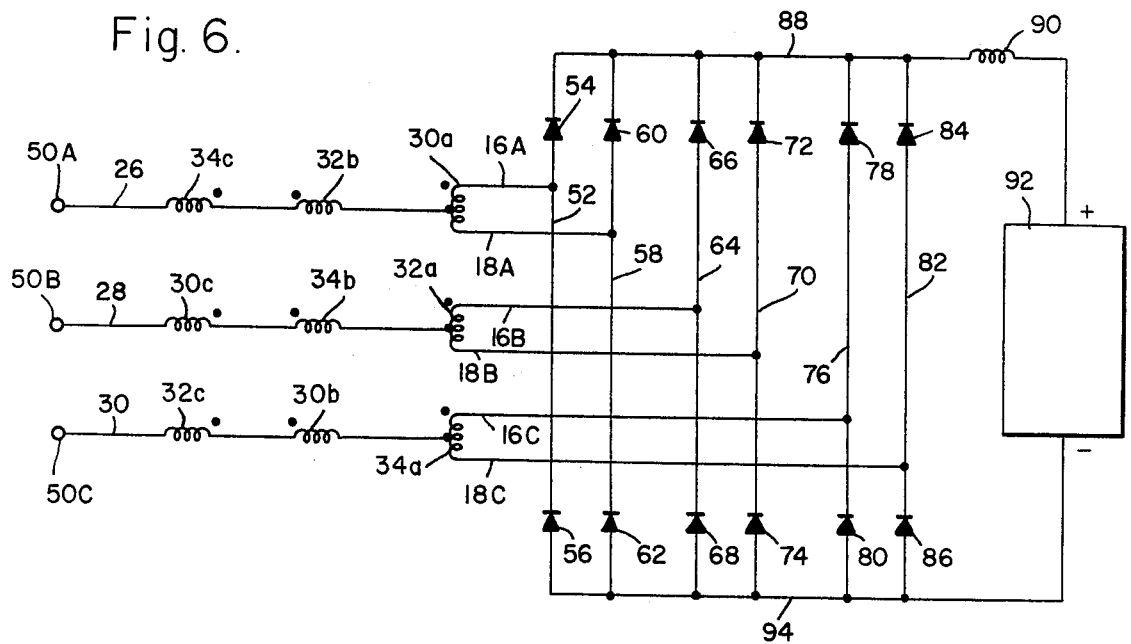
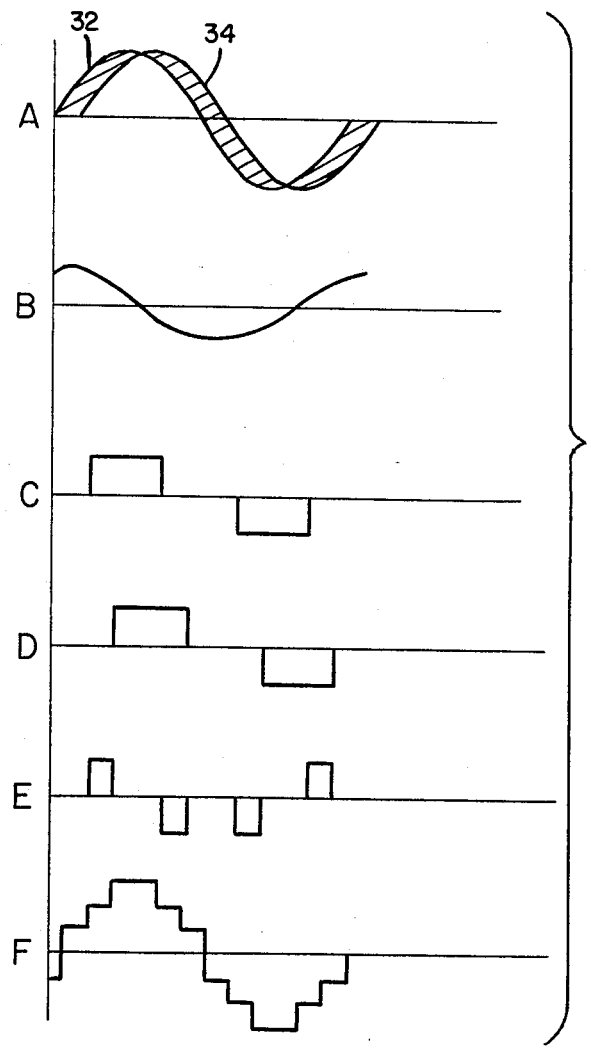
Fig. 5.

ALTERNATING CURRENT POWER DIVIDING OR COMBINING SYSTEM

It is well known in the prior art to utilize inverters to generate alternating current power which may be utilized in a wide variety of applications. If a three phase load is to be energized, it is well known to utilize three phase inverters for the purpose.

However, these inverters generate step wave outputs which are relatively high in harmonic content, unlike the sinusoidal output of an electrical-mechanical generator which contains only the fundamental frequency with relatively low harmonics. As is well known, the greatest portion of the harmonics in a step wave form comprises the fifth and seventh harmonics which have respective amplitudes of about 20% and 14% of the amplitude of the fundamental.

While these harmonics may be tolerated in some applications, they are entirely unacceptable in others, such as motor drives, critical load equipment and reference power supplies. In these situations, it is necessary to eliminate these harmonics from the output of the inverter before it can be applied to the load.

Any harmonic may be removed by the use of filters in a manner well known to those skilled in the art. Each filter is tuned to a single harmonic and will effectively remove it from the output of the inverter. However, a separate filter must be used for each harmonic and a complete set of filters must be used in each phase. Alternatively, a single large filter which passes only the fundamental may be inserted in each phase of the output. In either case, a substantial number of filters may be required in any particular application, the filters being undesirable because of the great size and substantial weight of equipment as well as the high equipment cost.

It has been determined that the fifth and seventh harmonics may be eliminated by using two three-phase inverters. One of these inverters has its output leading the desired output wave form by 15°; the other inverter has its output lagging by 15° the desired wave form. If these two outputs can be combined to produce a single three phase output, it will have little or no fifth or seventh harmonic content. This is accomplished in the prior art by passing the output of each inverter through an appropriate transformer and combining the output of the secondaries in a manner, such as through the use of phase shifting windings, which produces the desired wave form. The drawback of this method, however, is that each transformer must be sufficiently large to carry the full power rating of the associated inverter. Thus, the transformers are of considerable size and weight and suffer from substantial cost disadvantages.

In accordance with this invention, each of three pairs of corresponding output phases of the two inverters is delivered through the primary windings of a current sharing transformer. This combined current is summed vectorially with current from the other two phases to produce the desired output current. By using the current sharing transformer, only a net current equal to the current difference between the two inverter outputs must be carried by each transformer. Accordingly, the VA rating of each transformer is very small compared with the output of the inverters. The circuit may be utilized to combine either sine wave or square wave outputs and, when utilized in conjunction with square wave outputs, results in the substantial reduction or elimination of the troublesome fifth and seventh harmonics.

In an alternate embodiment, the novel transformers of this invention may be utilized to convert a three phase input voltage to a full wave rectified six phase output without reflecting significant fifth and seventh harmonics to the power source.

If desired, the novel and low cost circuitry of this invention may be utilized in a wide variety of applications and can be adapted for combining or splitting in numerous phase relationships.

The significant advantages of this invention will be more readily apparent when the following specification is read in conjunction with the appended drawings, wherein:

FIG. 5 is a series of curves labeled A-F illustrating operation of the circuits of this invention;

FIG. 6 is a schematic view of a circuit of this invention utilizing a three phase alternating current input to produce a six phase rectified output.

Figure 1:
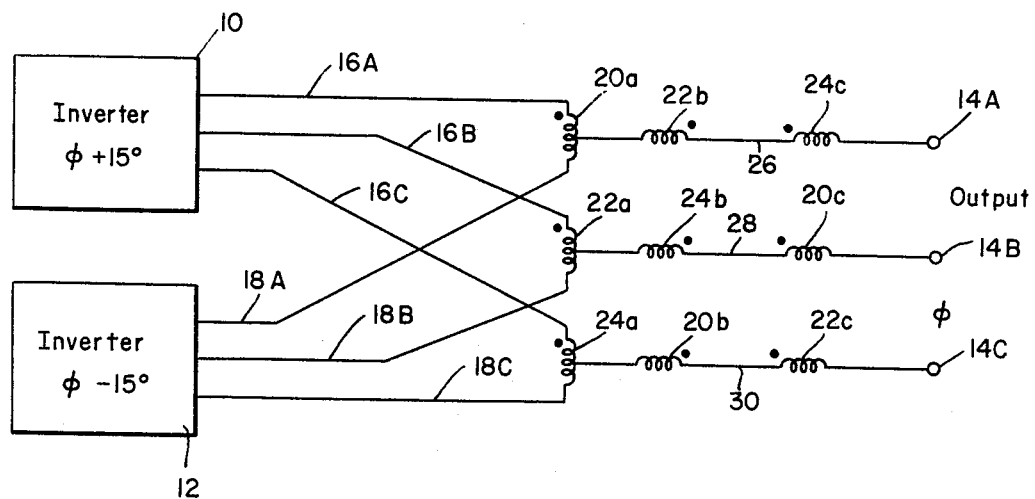
FIG. 1 is a schematic view of a circuit in accordance with this invention for combining the outputs of two three phase inverters.

Referring now to the drawings, FIG. 1 illustrates a circuit for utilizing the output of a three phase inverter 10 and a three phase inverter 12 to produce a three phase low harmonic output wave form at output terminals 14A, B, C. Unlike the method used in the prior art for combining the inverter outputs, the A, B and C phases of the output current wave form of the inverters are combined vectorially in three current transformers to produce the desired output. The output of the inverter 10 is delivered through conductors 16 A-C while the A-C phases of the output of the inverter 12 are delivered through conductors 18A-C, respectively. Conductors 16A and 18A are connected to opposite ends of a center tapped transformer winding 20a of a transformer 20. Conductors 16B and 18B are connected to opposite ends of a center tapped transformer winding 22a of a transformer 22. Conductors 16C and 18C are connected to opposite ends of a center tapped transformer winding 24a of a transformer 24.

A conductor 26 connects the center tap of the winding 20a through a winding 22b of a transformer 22 and a winding 24c of the transformer 24 to output terminal 14A. A conductor 28 is connected from the center tap of the winding 22a through a winding 24b of the transformer 24 and a winding 20c of the transformer 20 to output terminal 14B. A conductor 30 connects the center tap of the winding 24a through a winding 20b of the transformer 20 and a winding 22c of the transformer 22 to output terminal 14C.

Figure 2:
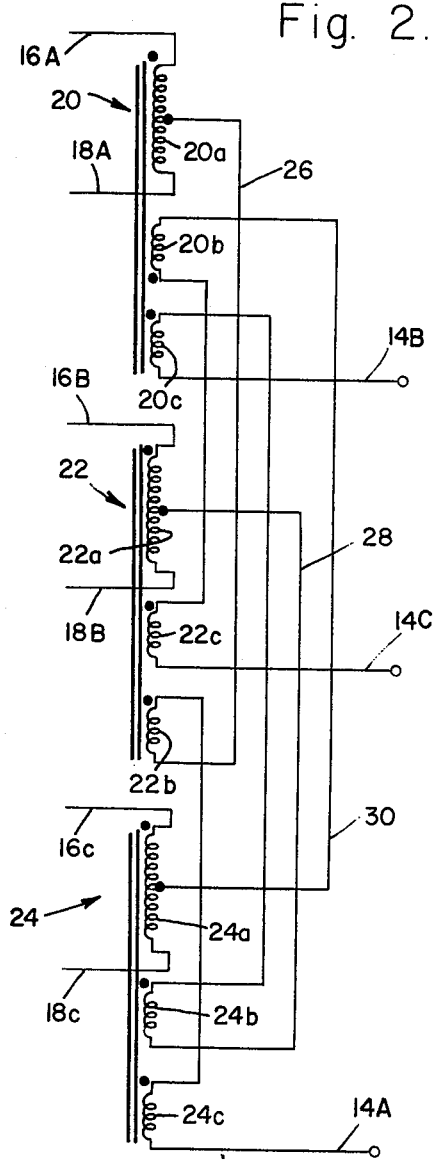
FIG. 2 is a schematic view of transformers for use in the circuit of FIG. 1.

The physical relationship of the windings of the transformers 20, 22 and 24 and their electrical interconnections are also illustrated in FIG. 2.

To understand operation, each of the inverters 10 and 12 may be considered to be a three phase source, the sources having a phase difference of 30°. The A-phase outputs are conducted through the conductors 16A and 18A to the transformer winding 20a. Current flow is from the ends of the winding 20a to a center tap. Because Lenz's Law requires that the sum of the ampere turns around a magnetic core be zero, the current flow through the two halves of the winding 20a will tend to be equal at all times regardless of differences in voltage so that the ampere-turns in each of the half-windings will be equal and opposite, creating a zero summation. Thus, the voltage which is impressed on the transformer is equal to the difference between the voltage outputs of the two inverter sources.

If we consider two sine wave outputs as shown in FIG. 5A, the first curve 32 representing the sine wave equivalent of the output of inverter 10 and the curve 34, displaced 30° therefrom, representing the sine wave equivalent of the output of inverter 12, prior art methods of combining these wave forms would require that each of two transformers carry the full current wave form and the full voltage wave form. It will be readily understood that the VA rating of such transformer would be determined by the full voltage and full current of the associated inverter. However, the transformer of the present invention sees only the difference between the two voltages which is shown by the shaded aea in FIG. 5A and can be shown as an equivalent sine wave of substantially smaller amplitude as illustrated in FIG. 5B. Thus, by the use of the transformer arrangement of this invention, transformers having a substantially smaller VA rating can be utilized. In fact, it has been determined that to provide a three phase output having a power rating of about 1 kilowatt, each transformer need have only a rating of about 70 volt-amps. This provides a substantial saving in weight, size and cost of the equipment utilized.

FIGS. 5C and 5D represent respectively the square wave outputs of the inverters 10 and 12. As with the sine waves illustrated in FIG. 5A, prior art transformer would have to have a VA rating sufficient to carry the full inverter output currents and voltages. However, the transformers of this invention need only carry the difference between these voltages as illustrated in FIG. 5E. Thus, the much lower VA rating transformers previously described may be utilized.

Referring again to FIG. 1, the current from the A phases of the inverters 10 and 12 flow through the equal current winding 20a to a center tap and then to an output terminal 14A, flowing through the transformer windings 22b and 24c. As can be seen in FIG. 2, winding 22B is a secondary winding of the transformer 22. Thus, the phase orientation of the current induced in the winding 22b is determined by the B phase outputs of the inverters 10 and 12. Similarly, the winding 24c is a secondary winding of the transformer 24 so that the phase orientation of its induced current is determined by the C phase outputs of the inverters 10 and 12. Thus, when the combined A phase current flows are summed with the current induced in the windings 22b and 24c, it is not a simple arithmetic sum but rather a vector sum and the resulting output current at the output terminal 14A differs in phase from the input currents, the precise relationship being dependent upon the magnitudes of the currents induced in the windings of 22b and 24c.

Figure 3:
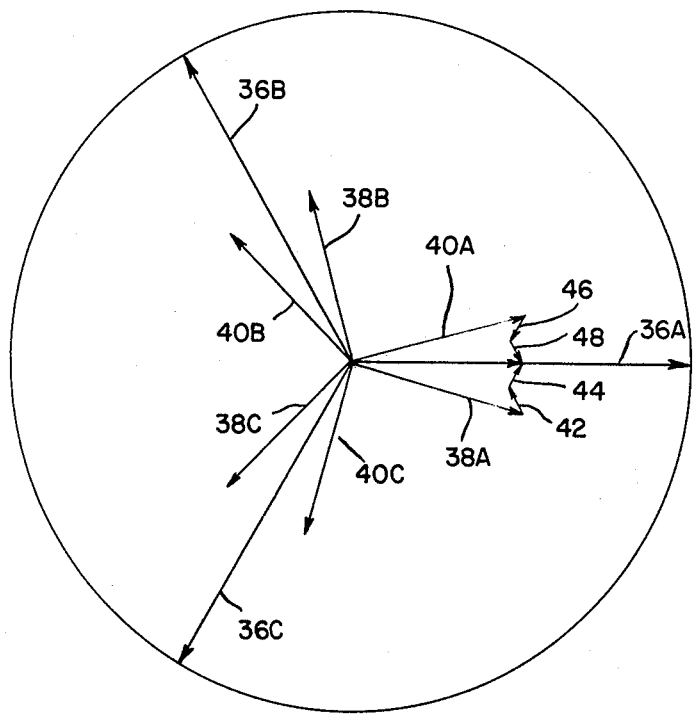
FIGS. 3 and 4 are vector diagrams illustrating the operating principle of the transformers of FIG. 2.

The use of the transformers 20, 22 and 24 of FIGS. 1 and 2 to produce the desired input/output phase relationships can best be understood by referring to FIG. 3 which is a standard vector representation of the three phase current relationships of this invention. As illustrated, currents 36A, 36B and 36C are the desired output currents to be produced at the output terminals 14A, 14B and 14C, 38A, 38B and 38C represent the output currents of one source while 40A, 40B and 40C represent the output currents of the other source.

The operation of the transformer arrangement of this invention will be explained with respect to the A phase outputs. The current vectors 38A and 40A have magnitudes just slightly greater than half the magnitude of the desired current vector 36A. Vector addition of the current 38A to a current vector 42 and a current vector 44 yields a resultant current vector which is equal in direction to the resultant vector 36A and one half its magnitude. By adding current vectors 46 and 48 to the vector 30A, a current vector having the direction as the resultant current 36A but one-half its magnitude can also be produced. The sum of these two vectors is, of course, the desired current vector 36a.

Vectors 42 and 48 are equal in magnitude and opposite in direction, the direction of each vector being parallel to that of current vector 36B. The current vectors 44 and 46 are also equal in magnitude and opposite in direction, the directions being parallel to that of the current vector 36C. This mathematical analogy shows that combining each of two A phase current wave forms which are 30° out of phase from each other with portions of the B and C phase currents yields a resultant current wave form phased midway between the two. Further, because all of the current vectors 42, 44, 46, 48 are equal in magnitude, the system can be a balanced system.

As seen in FIG. 1, the current vector 40A flows through the conductor 16A and one half of the winding 20a. It then flows through the winding 22b, which adds the vector 48, and through the winding 24c, which adds the vector 46. Vector 38A passes through the conductor 18A and the other half of the winding 20a. It then flows through the winding 22b, which adds the vector 42, and the winding 24c, which adds the vector 44. The resultant combination of these currents is the vector 36A, which current wave forms appears at the output terminal 14A. As will be immediately obvious to the artisan, this same analysis can be applied to the B and C phases.

By solution of the simultaneous equations:

$$I_A 1 = \tfrac{1}{2} I_A \cos \phi - N [I_B \cos (\phi + 120°) - I_C \cos (\phi + 240°)]$$

and $$I_A 2 = \tfrac{1}{2} I_A \cos \phi + N [I_B \cos (\phi + 120°) - I_C \cos (\phi = 240°)],$$

the value of the turns ratio N which will produce the desired resultant current wave forms can be calculated. The solution to this equation for lead and lag angles of 15° is a turns ratio N of about 0.777. This means that for each turn on the transformer primary windings 20a, 22a and 24a, there need only be 0.077 turns on each of the secondary windings to produce the desired resultant current wave form.

It has been determined experimentally that the same shift in wave forms which results from the application of sinusoidal currents to the transformers 20, 22, 24 will result from the application of three phase inverter outputs to the transformer. This means that, if the wave forms illustrated in FIG. 5C and 5D are combined through the transformer arrangement of FIGS. 1 and 2, the wave form appearing at the output terminal 14A will be substantially as illustrated in FIG. 5F. As is well known to those skilled in the art, this output wave form represents a current which is substantially devoid of the undesirable fifth and seventh harmonics which are found to be to a great extent in the input wave forms of FIG. 5C and 5D.

Figure 4:
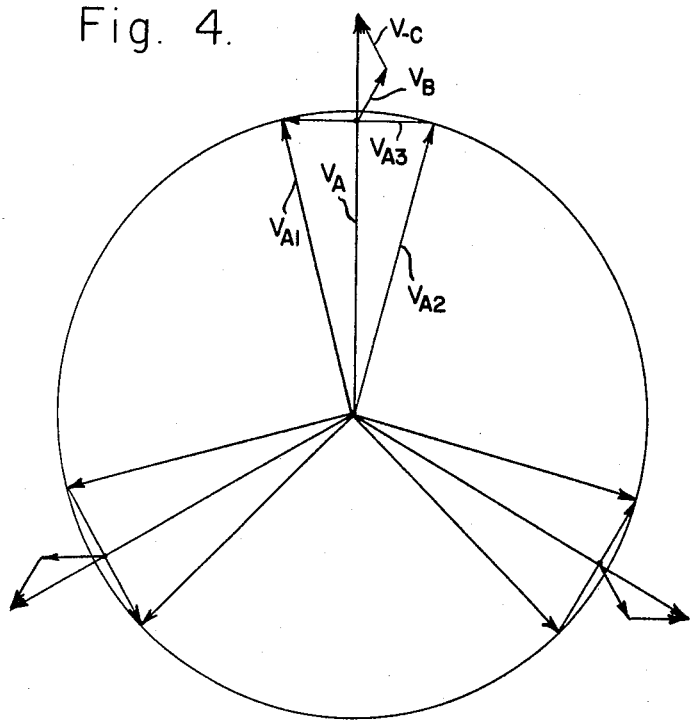

The voltage relationships are illustrated in FIG. 4 wherein the voltage combinations resulting in the A, B and C phase outputs are illustrated. However, only the A phase relationships will be discussed. The voltages applied to the winding 20A are illustrated as $V_{A1}$ and $V_{A2}$. The application of these voltages to the winding 20A results in the voltage $V_{A3}$ being produced in the winding.

Because the conductor 26 is connected to a center tap on the winding 20A, one half the voltage is added to the voltages $V_B$ and $V_C$ on passage through the windings 22b and 24c respectively. The resulting voltage sum is the vector $V_A$.

FIG. 6 illustrates the use of the transformer circuit of this invention to convert a three phase current input to a six phase fully rectified output for powering a load. As is well known, prior art methods for providing six pulse three phase full wave rectified power have generated high fifth and seventh harmonic current levels back into the line requiring large carefully tuned harmonic filters for the removal. Additionally, a high sixth harmonic ripple current has appeared in the output requiring a large output filter. A circuit of this invention utilizing smaller transformers than used in the prior art generates substantially no fifth and sixth harmonics back into the line and utilizes only a small output filter because the twelfth harmonic is now the largest ripple component.

The three phase input voltage, which may be sinusoidal or square wave is fed through input terminals 50A-C. The A phase current travels from input terminal 50A via conductor 26 through primary windings 34c and 32b the current sharing winding 30a which causes the current to be divided with equal portions flowing through conductors 16A and 18A. Similarly, the B phase flows from input terminal 50B via conductor 28 through windings 30c and 34b to be divided through the winding 32a between conductors 16B and 18B. The C phase flows from input terminal 50C via conductor 30 through windings 32c and 30b and is divided by the winding 34a between conductors 16C and 18C.

The conductor 16A is connected to a conductor 52 between diodes 54 and 56. The conductor 18A is connected to a conductor 58 between diode 60 and 62. Conductor 16B is connected to a conductor 64 between diodes 66 and 68. The conductor 18B is connected to a conductor 70 between diodes 72 and 74. The conductor 16C is connected to a conductor 76 between diodes 78 and 80. The conductor 18C is connected to conductor 82 between diodes 84 and 86. All of the diodes are similarly poled in the usual manner for such rectifier circuits. If reversibility or voltage control is desired, thyristors or other controllable switching devices may be substituted for the rectifiers.

The diodes 54, 60, 66, 72, 78 and 84 are connected by a conductor 88 through a smoothing inductor 90 to a load 92 which is to be powered. The diodes 56, 62, 68, 74, 80 and 86 are connected to the load 92 by a conductor 94.

In the same manner of operation by which the circuit of FIG. 1 combines current through the current sharing winding of the transformer and vectorially adds them to other currents to produce a single resultant output current in the manner shown with respect to FIG. 3, the circuit of FIG. 4 divides the single input current vector and sums the portions divided through the currents sharing transformer windings with other current vectors to produce resultant output currents which are substantially equal in magnitude but have a predetermined phase difference. As previously discussed, a transformer ratio N of 0.777 will produce a phase difference of about 30° for the split portions of each phase.

As will be readily understood by those skilled in the art, a generally uniform direct current will be provided to the load 92 through the rectifier circuit, flow of current being from the most positively biased of the diodes 54, 60, 66, 72, 78, 84 through the conductor 88, inductor 90, load 92 and conductor 94 to the most negatively biased of the diodes 56, 62, 68, 74, 80, 86. Because of the action of the transformers 20, 22 and 24 in the manner previously described, this rectification is accomplished with little or no generation of the undesirable fifth and seventh harmonics so difficult and expensive to eliminate in prior art circuits.

It should be noted that the particular inputs and outputs utilized in the illustrated dividing and combining circuits are for purposes of example only and not considered to impose a limitation on the use of the circuitry of this invention. It will be readily understood by the artisan how the disclosed novel circuitry may be used in additional dividing or combining situations.

Figure 7:
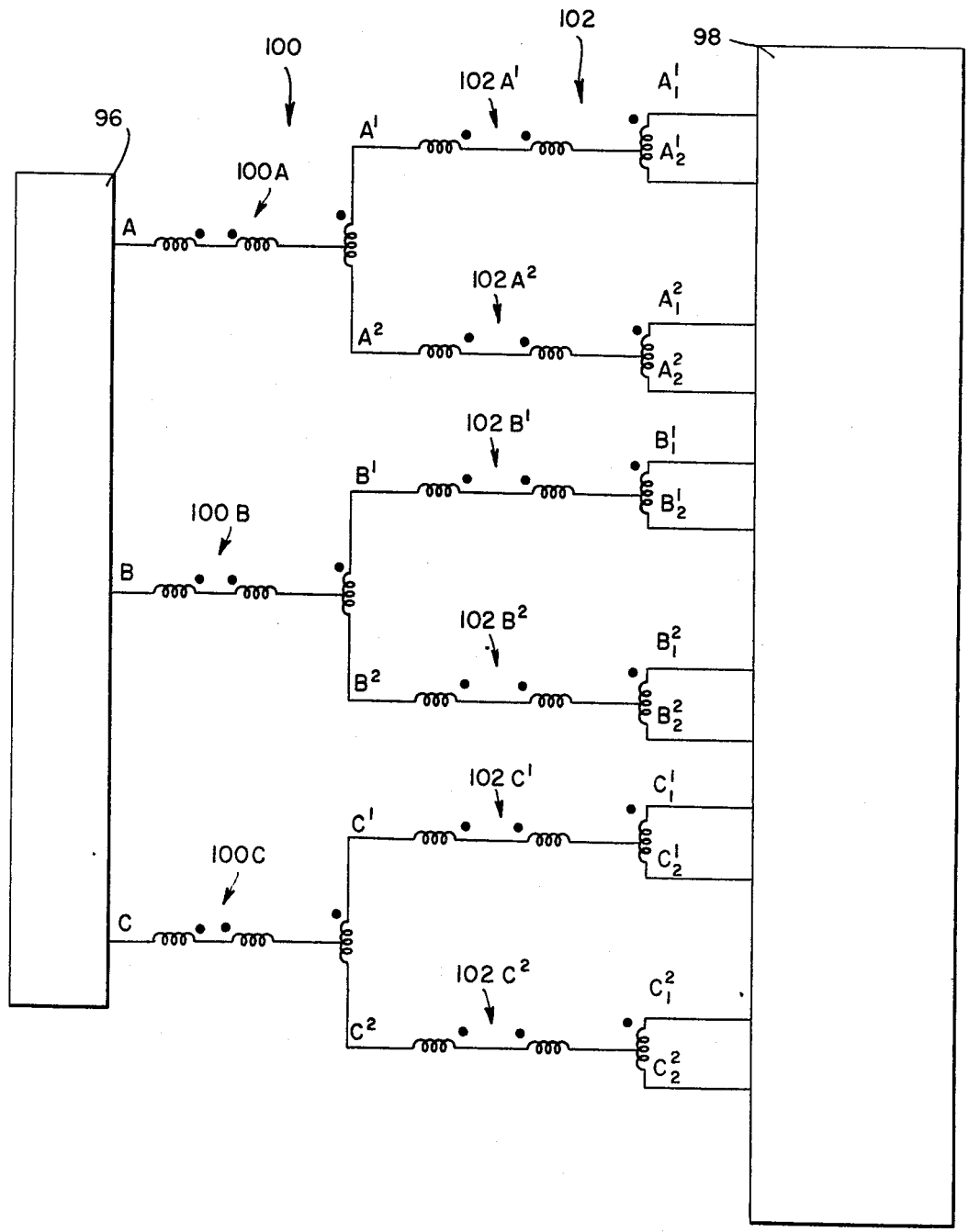

One example of an expansion of the operational concept of this invention is illustrated in FIG. 7 wherein transformers in accordance with this invention are coupled to divide or combine phases between a three-phase device 96 and a twelve-phase device 98. The three-phase device 96 may be a three-phase load or a source of three-phase power. The 12-phase device 98 may be four three-phase inverters phased 15 degrees apart, a 24 pulse rectifier (12-phase, full wave), or a 24 pulse controlled rectifier.

As can be seen in FIG. 7, a first transformer array 100 having three branches 100A, 100B and 100C divides or combines between the three-phase device 96 and a six-phase interim configuration. A second transformer array 102 having branches $102A^1$, $102A^2$, $102B^1$, $102B^2$, $102C^1$ and $102C^2$ divides or combines between the six-phase interim configuration and the 12-phase device 98. In this arrangement, the transformer array 100 preferably has a turns ratio of about 0.038 while the transformer array 102 preferably has a turns ratio of about 0.077.

Figure 8:
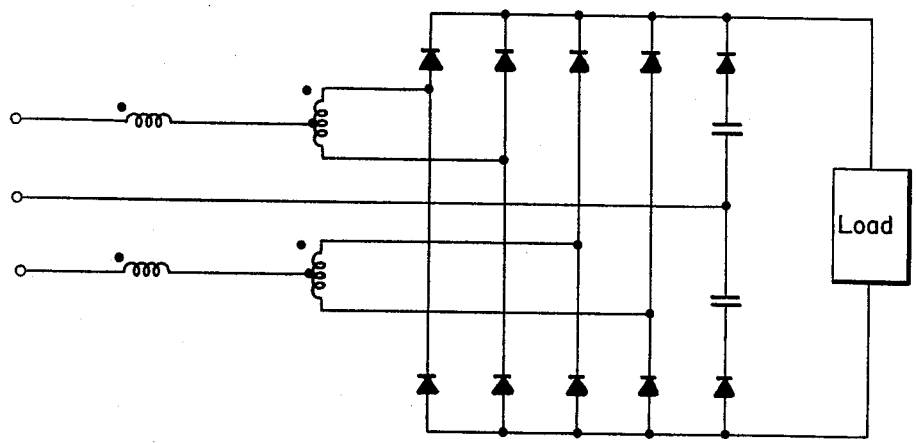
FIGS. 7 and 8 are schematic views of alternate embodiments in accordance with this invention.

The use of the transformers of this invention to create other such power dividing or combining configurations will be readily understood and it can be seen that virtually any transference between varied pulse systems, such as the two-phase to eight-pulse inversion illustrated in FIG. 8 can be accomplished in accordance with this invention while utilizing transformers with low VA ratings.

I claim:

1. A transformer of relatively low VA rating for converting an N phase input waveform to an M phase output waveform wherein M is an integer and N is an integer not less than three, said transformer comprising:
   primary winding means having at least two coils operatively associated with each phase;
   secondary coil means operatively associated with each phase and having a center connection and end connections; and
   means for connecting one of said primary winding means coils of a first phase to one of said primary winding means coils of a second phase in series opposition and to said center connection of said secondary coil means of a third phase.

2. A transformer of claim 1 including:
means for connecting a load to said end connection of said secondary coil means to establish a predetermined phase relationship between currents at said end connections.

3. A method of dividing a multiphase waveform with a plurality of relatively low VA rated transformers, each transformer having a current sharing winding with outputs and a central input, and at least two auxiliary windings, said method comprising the steps of:
generating voltages in said auxiliary windings;
passing each phase of said waveform through an auxiliary winding of two of said transformers to the central input of a current sharing winding of a third of said transformers; and
producing output waveforms at said current sharing winding outputs.

4. The method of claim 3 including the additional step of rectifying said output waveforms for application to a load.

5. The method of claim 3 including additional transformers having auxiliary and current sharing windings for each of said transformer output waveforms and including the additional steps of:
applying each of said transformer output waveforms through an auxiliary winding of two of said additional transformers to the current sharing winding input of an other of said additional transformers for generating output waveforms at the current sharing winding outputs of each of said additional transformers.

* * * * *